United States Patent
Lee et al.

(10) Patent No.: US 7,575,488 B2
(45) Date of Patent: Aug. 18, 2009

(54) RECEPTACLE CONNECTOR FOR A BATTERY IN THE MOBILE ELECTRIC DEVICE

(75) Inventors: Seung-Hee Lee, Sungnam-Si (KR); Sang-Hun Lee, Uiwang-Si (KR)

(73) Assignee: Korea Air Electronics Co., Ltd., Ansan-Si (KR)

( * ) Notice: Subject to any disclaimer, the term of this patent is extended or adjusted under 35 U.S.C. 154(b) by 0 days.

(21) Appl. No.: 12/035,287

(22) Filed: Feb. 21, 2008

(65) Prior Publication Data

US 2009/0156023 A1    Jun. 18, 2009

(30) Foreign Application Priority Data

Dec. 17, 2007    (KR) .................. 10-2007-0132277

(51) Int. Cl.
*H01R 4/02* (2006.01)
(52) U.S. Cl. ............... 439/876; 439/83; 439/943; 439/82
(58) Field of Classification Search ............ 439/82, 439/83, 876, 943
See application file for complete search history.

(56) References Cited

U.S. PATENT DOCUMENTS

| | | | | |
|---|---|---|---|---|
| 3,899,231 A | * | 8/1975 | Bray | 439/80 |
| 4,070,077 A | * | 1/1978 | Clark | 439/876 |
| 5,115,375 A | * | 5/1992 | Garay | 361/760 |
| 6,450,839 B1 | * | 9/2002 | Min et al. | 439/751 |

* cited by examiner

*Primary Examiner*—Tho D Ta
(74) *Attorney, Agent, or Firm*—Connolly Bove Lodge & Hutz LLP

(57) ABSTRACT

Provided is a receptacle connector for a battery in a mobile electric device. The receptacle connector includes a contact terminal, a connection terminal, and an extension portion. The contact terminal electrically contacts a plug connector of the mobile electric device. The connection terminal is fit and soldered in a through hole of a battery PCB, and is integrally formed with the contact terminal. The extension portion is bent and extends from a front end of the connection terminal to form a solder receiving space for receiving solder flowing through the through hole of the PCB together with the connection terminal while a soldering operation is performed on the connection terminal. The extension portion together with the connection terminal is fit and soldered in the through hole of the PCB.

1 Claim, 4 Drawing Sheets ated to the battery in the mobile electric device, the circuit of the battery PCB can be protected and the connection terminal can be solidly coupled to the battery PCB by minimizing a solder rise phenomenon while a soldering operation is performed on the PCB.

RECEPTACLE CONNECTOR FOR A BATTERY IN THE MOBILE ELECTRIC DEVICE

RELATED APPLICATIONS

This application claims priority to Korean Patent Application No. 10-2007-0132277 filed Dec. 17, 2007, disclosure of which is incorporated herein by reference.

BACKGROUND OF THE INVENTION

1. Field of the Invention

The present invention relates to an electric connector, and more particularly, to a receptacle connector provided to the battery in a mobile electric device.

2. Description of the Related Art

Generally, a mobile electric device such as a mobile communication terminal includes a detachable battery. Connectors are provided to a battery and a mobile electric device, respectively, so that the battery and the mobile electric device are electrically connected with each other.

There are two types of electrically connecting the battery with the mobile electric device using connectors. That is, in one of the two types, the connector of the mobile electric device elastically supports the connector of the battery. In the other, the connector of the battery elastically receives the terminal of the mobile electric device.

Here, in the case where the connector of the mobile electric device elastically supports the connector of the battery, a structure of mounting the connector to the mobile electric device is complicated and occupies a large volume. Accordingly, the former case generates high manufacturing costs and high failure rate and is contradictory to a trend of a slim profile.

Meanwhile, as the latter case where the connector of the battery elastically receives the terminal of the mobile electric device, there is "Cap for Battery of Mobile Electric Device" disclosed in Japanese Laid Open Patent Application No. 2006019287, in which a housing 24 is provided on one side of a battery 4 that is detachable from a mobile electric device, a plurality of connectors 12 are provided to the housing 24, and the connectors 12 are fixed to a printed circuit board (PCB) 10 and electrically connected to the electric circuit of the battery 4.

A plurality of through holes 26 in which the connectors 12 are fit are formed in the PCB 10. When a soldering operation is performed with the connectors 12 fit in the through holes 26, a solder rise phenomenon that flux flows out through the through holes 26 in a side opposite to a side where a fillet is formed. Accordingly, the circuit of the PCB 10 may be short-circuited.

To solve this limitation, a soldering operation has been performed with the through holes 26 covered with a plastic layer (film), and the connectors 12 passing through the plastic layer and fit in the through holes 26 in a related art. However, even in this case, the plastic layer may be molten by a solder temperature, so that the solder rise phenomenon still occurs through the through holes 26.

SUMMARY OF THE INVENTION

Accordingly, the present invention is directed to a receptacle connector for a battery in a mobile electric device that substantially obviates one or more problems due to limitations and disadvantages of the related art.

Embodiments of the present invention provide a receptacle connector for a battery in a mobile electric device that can minimize a solder rise phenomenon while a soldering operation is performed on the PCB of the battery to protect the circuit of the PCB.

Additional advantages and features of the invention will be set forth in part in the description which follows and in part will become apparent to those having ordinary skill in the art upon examination of the following or may be learned from practice of the invention.

In one aspect of the present inventions there is provided a receptacle connector for a battery in a mobile electric device, the receptacle connector including: a contact terminal electrically contacting a plug connector of the mobile electric device; a connection terminal fit and soldered in a through hole of a battery PCB, the connection terminal being integrally formed with the contact terminal; and an extension portion bent and extending from a front end of the connection terminal to form a solder receiving space for receiving solder flowing through the through hole of the PCB together with the connection terminal while a soldering operation is performed on the connection terminal, the extension portion together with the connection terminal being fit and soldered in the through hole of the PCB.

A solder inflow hole allowing solder to flow into the solder receiving space may be formed in one side of at least one of the connection terminal and the extension portion.

The connection terminal and the extension portion may be formed in a 'V' shape on the whole. Also, the connection terminal and the extension portion may be formed in a 'U' shape on the whole.

The receptacle connector according to the present invention may further include a seat bent and extending from a front end of the extension portion, and supported by an upper surface of a battery PCB.

A hooking portion supported by a solder surface of the battery PCB may be formed on an outer surface of at least one of the connection terminal and the extension portion.

It is to be understood that both the foregoing general description and the following detailed description of the present invention are exemplary and explanatory and are intended to provide further explanation of the invention as claimed.

According to the above-descried receptacle connector for the battery in the mobile electric device, the circuit of the battery PCB can be protected and the connection terminal can be solidly coupled to the battery PCB by minimizing a solder rise phenomenon while a soldering operation is performed on the PCB.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
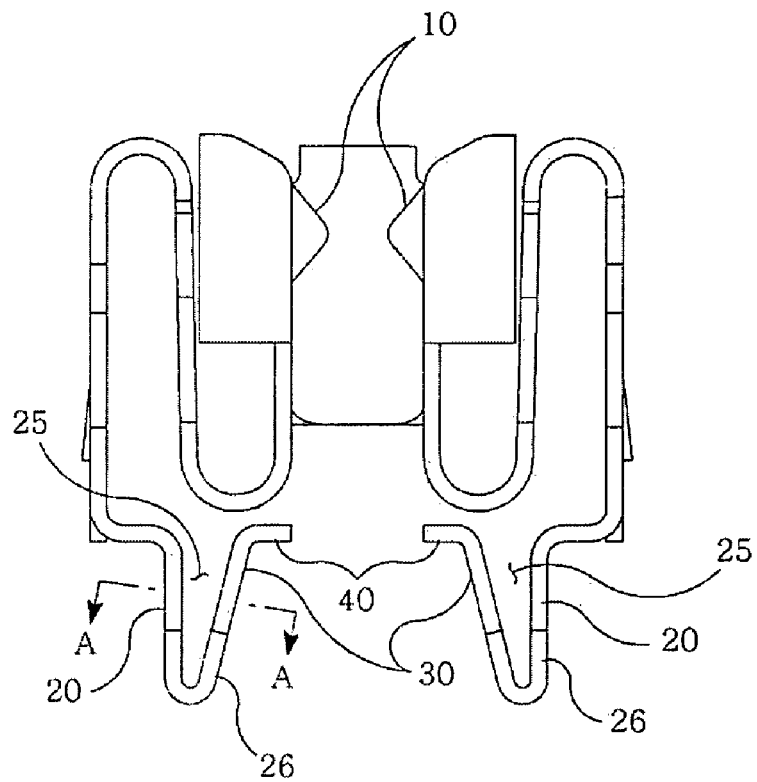
FIGS. 1 and 2 are side views illustrating a receptacle connector for a battery in a mobile electric device according to an embodiment of the present invention.
Figure 2:
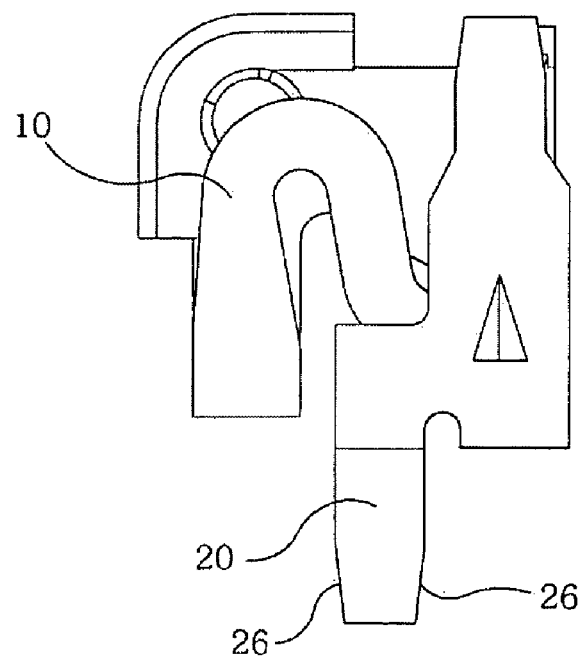

Reference will now be made in detail to the preferred embodiments of the present invention, examples of which are illustrated in the accompanying drawings. Wherever possible, the same reference numbers will be used throughout the drawings to refer to the same or like parts.

Referring to FIGS. 1 to 7, a receptacle connector for a battery in a mobile electric device according to an embodiment of the present invention includes a contact terminal 10 electrically contacting a plug connector 2 of a mobile electric device, a connection terminal 20 fit and soldered in a through hole 1a of a battery PCB 1, and an extension portion 30 bent and extending from the front end of the connection terminal 20 to form a receiving space for receiving solder flowing through the through hole 1a of the battery PCB 1 together with the connection terminal 20 while a soldering operation is performed on the connection terminal 20.

The contact terminal 10 elastically supports and is electrically connected to the plug connector 2 while moving in a direction crossing an entry direction of the plug connector 2 of the mobile electric device.

The connection terminal 20 is integrally and continuously formed with the contact terminal 10, and is fit in the through hole 1a of the battery PCB 1.

An extension portion 30 extends in a cantilever shape from the lower end of the connection terminal 20. The extension portion 30 is bent to form a 'V' shape on the whole.

That is, the connection terminal 20 and the extension portion 30 are formed in the 'V' shape on the whole, and the extension portion 30 elastically moves with respect to the connection terminal 20. Therefore, when the connection terminal 20 and the extension portion 30 are fit in the through hole 1a, they are elastically fit in the through hole 1a while an angle formed by the connection terminal 20 and the extension portion 30 decreases.

Meanwhile, in the case where the connection terminal 20 and the extension portion 30 are formed in the 'V' shape, a portion where the connection terminal 20 and the extension portion cross is formed shape and so may be destroyed. Therefore, the connection terminal 20 and the extension portion 30 can be formed in a 'U' shape.

The extension portion 30 is fit and soldered in the through hole 1a of the battery PCB 1 together with the connection terminal 20.

A solder inflow hole allowing solder to flow into a solder receiving space 25 is formed in one side of the connection terminal 20 and the extension portion 30.

Figure 3:
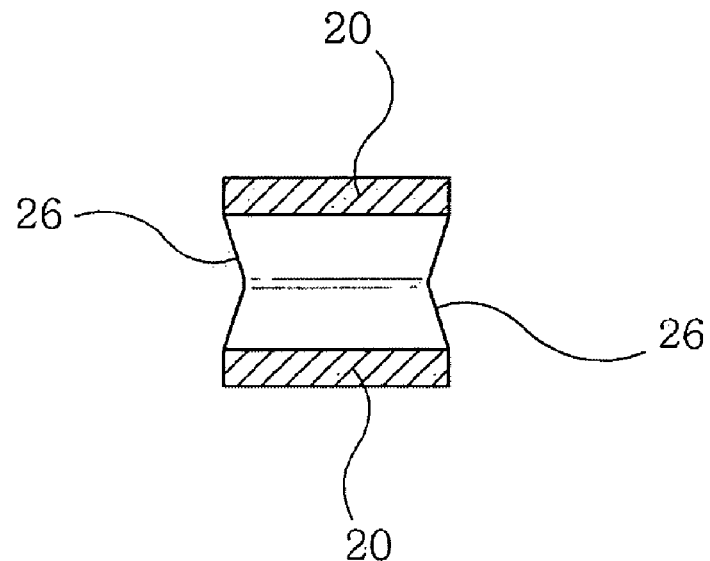
FIG. 3 is a horizontal cross-sectional view taken along a line A-A' of FIG. 1.

Regarding the solder inflow hole 26, one sides of the connection terminal 20 and the extension portion 30 are cut to form a space through which solder can flow. As illustrated in FIG. 3, the solder inflow hole 26 can be formed as a 'V'-shaped groove.

Figure 4:
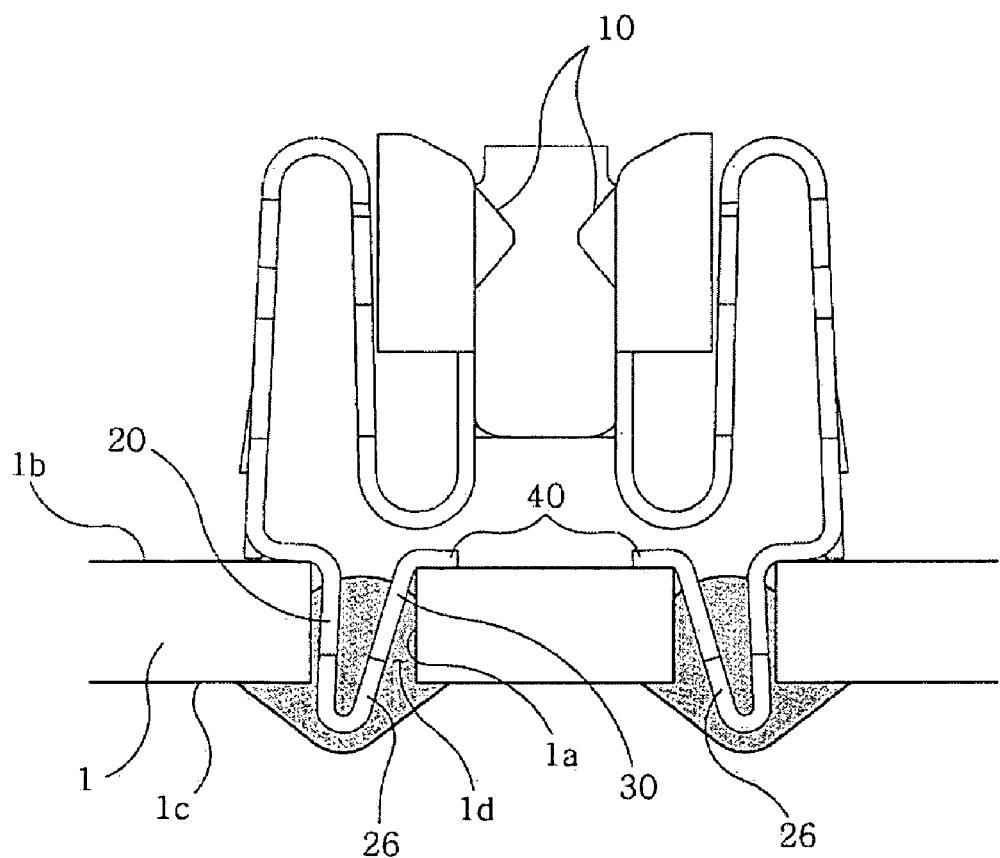
FIGS. 4 and 5 are schematic side views illustrating the installed receptacle connector for the battery in the mobile electric device illustrated in FIG. 1.
Figure 5:
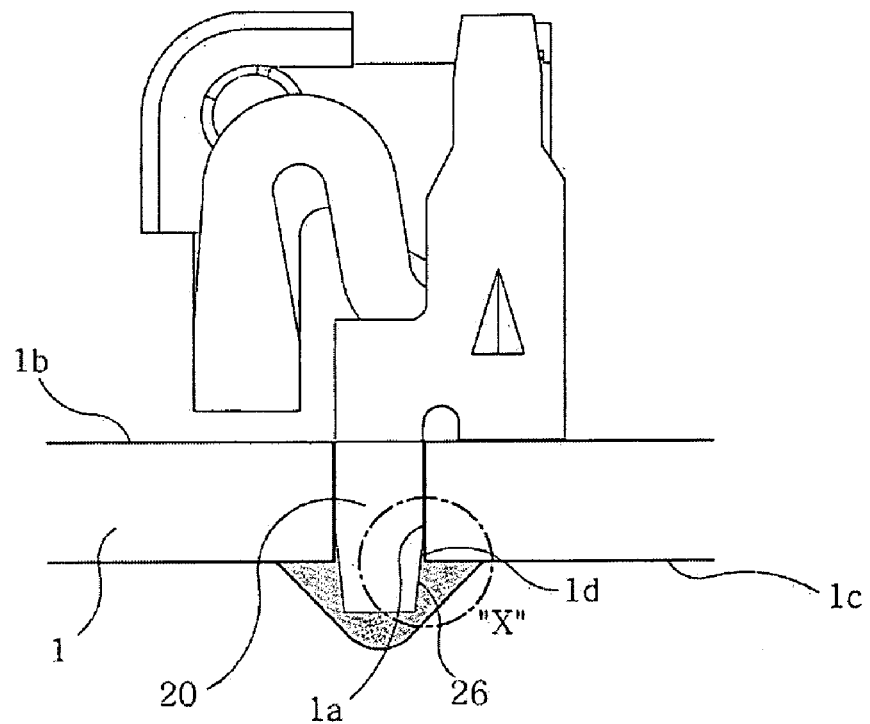
Figure 6:
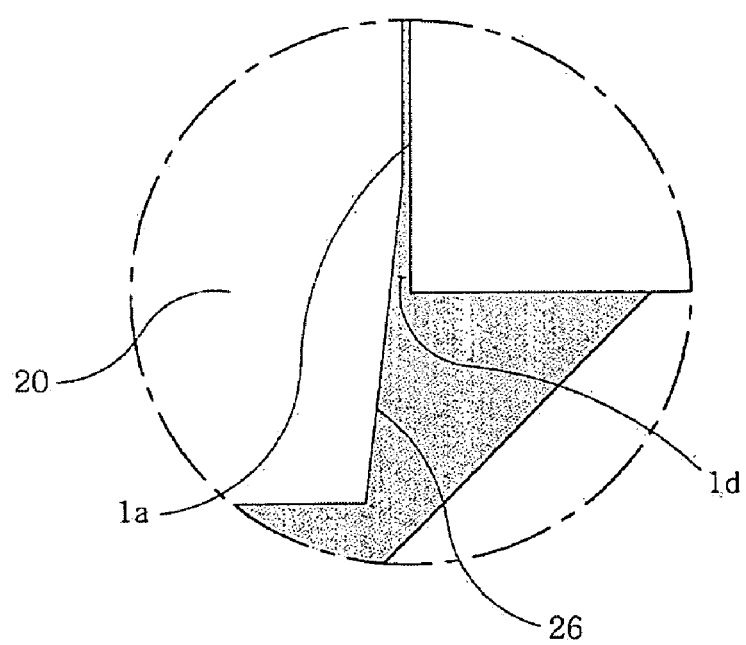
FIG. 6 is an enlarged view of the portion 'X' of FIG. 5.
Figure 7:
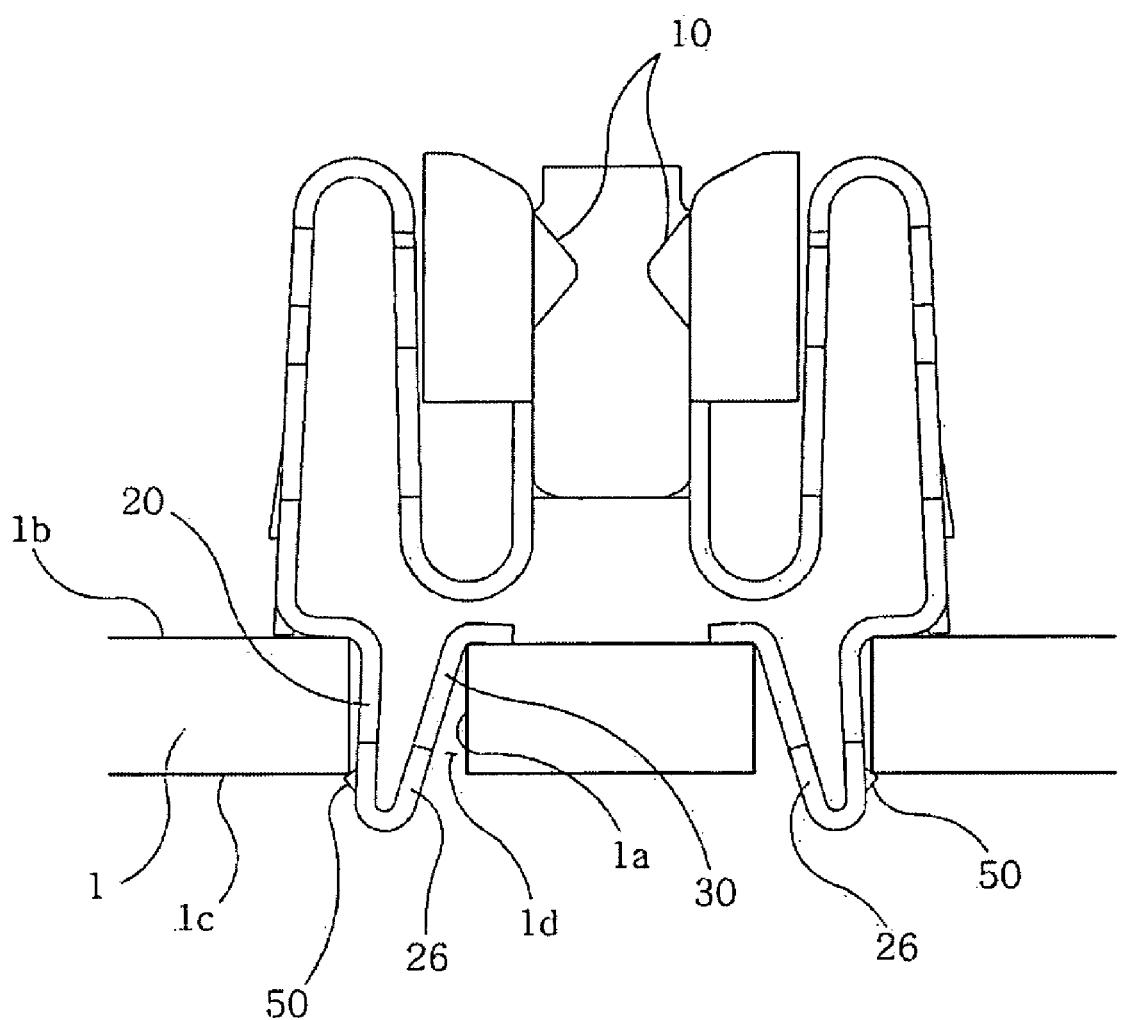
FIG. 7 is a side view illustrating an installed receptacle connector for a battery in a mobile electric device according to another embodiment of the present invention.

Referring to FIGS. 4 to 6, when a soldering operation is performed at the lower surface 1b of the PCB 1 with the connection terminal 20 and the extension portion 30 fit and seated in the through hole 1a, liquid solder flows into the solder receiving space 25 through the solder inflow hole 26, so that the solder does not reach the upper surface 1c of the PCB 1.

That is, since there is a gap 1d between the connection terminal 20 and the extension portion 30, and the inner sidewall of the through hole 1a, a portion of the solder moves to the upper surface 1c of the PCB 1 through this space, and most of the solder flows into the solder receiving space 25 through the solder inflow hole 26.

Therefore, the solder rise phenomenon that liquid solder moves to the upper surface 1C of the PCB 1 along the connection terminal 20 or the extension portion 30 can be minimized, so that a circuit formed on the upper surface of the PCB 1 can be protected.

The liquid solder introduced to the solder receiving space 25 is cured to form a solid lump together with the connection terminal 20 and the extension portion 30, and simultaneously, the solder inside the through hole 1a including the solder of the solder receiving space 25 is molten on the inner sidewall of the through hole 1a. Also, a portion of the solder forms a fillet on the lower surface of the PCB 1 to solidly support the connection terminal 20 and the extension portion 30.

The solder cured inside the through hole 1a supports the inner sidewall of the through hole 1a and the connection terminal 20 and the extension portion 30 integrally to solidly couple the connection terminal 20 and the extension portion 30 to the PCB 1.

A seat 40 supported by the upper surface 1c of the PCB 1 extends from the front end of the extension portion 30.

The seat 40 is bent from the front end of the extension portion 30 toward the upper surface 1c of the PCB 1. The seat 40 is supported by the upper surface 1c of the PCB 1, so that a depth to which the extension portion 30 is inserted into the through hole 1a is limited.

That is, the extension portion 30 is hooked at and supported by the upper surface 1c of the PCB 1, so that the extension portion 30 can stop at a predetermined position without protruding to more than a predetermined distance toward the lower surface of the PCB 1.

A hooking portion 50 supported by the lower surface 1b of the PCB 1 can be formed on the outer surface of the connection terminal 20 and the extension portion 30.

The hooking portion 50 supports the connection terminal 20 and the extension portion 30 that protrude to the lower surface 1b of the PCB 1 through the through hole 1a such that the connection terminal 20 and the extension portion 30 cannot be restored to the upper surface 1c of the PCB 1.

That is, the hooking portion 50 is formed on the outer surface of the connection terminal 20 and the extension portion 30 that protrude to the lower surface 1b of the PCB 1, and hooked at and supported by the front end of the lower surface 1b of the PCB 1. Therefore, the connection terminal 20 and the extension portion 30 are prevented from moving to a reverse direction of a fitted direction.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A receptacle connector for a battery in a mobile electric device, soldered and coupled to a printed circuit board (PCB) of a battery attached to and detached from the mobile electric device, the receptacle connector comprising:

a contact terminal electrically contacting a plug connector of the mobile electric device;

a plurality of connection terminals, wherein each connection terminal being fitted and soldered in a through hole of the battery PCB, each connection terminal being integrally formed with the contact terminal; and an extension portion extended from a front end of each connection terminal, being fitted to be soldered in the through hole of the PCB, wherein the extension portion is bent in a "U" shape to form a solder receiving space for receiving solder flowing through the through hole of the PCB in the soldering operation of the connection terminal, and further including a solder inflow hole for allowing the solder to flow into the solder receiving space, a seat bent at the end of the extension portion to be supported on the top surface of the PCB, and a hooking portion protruded from the outer surface thereof to be engaged on the bottom surface of the PCB.

* * * * *